US012212579B2

(12) United States Patent
Gremaud et al.

(10) Patent No.: US 12,212,579 B2
(45) Date of Patent: *Jan. 28, 2025

(54) SECURELY TRANSMITTING DATA IN A DATA STREAM

(71) Applicant: NAGRAVISION Sàrl, Cheseaux sur Lausanne (CH)

(72) Inventors: Fabien Gremaud, Cheseaux sur Lausanne (CH); Frederic Thomas, Cheseaux sur Lausanne (CH); Jean-Bernard Fischer, Rochejean (FR)

(73) Assignee: NAGRAVISION Sàrl, Cheseaux sur Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,150

(22) Filed: Jul. 17, 2023

(65) Prior Publication Data

US 2024/0022575 A1   Jan. 18, 2024

Related U.S. Application Data

(63) Continuation of application No. 17/298,062, filed as application No. PCT/EP2019/082925 on Nov. 28, 2019, now Pat. No. 11,750,620.

(30) Foreign Application Priority Data

Dec. 3, 2018   (EP) ..................... 18209942

(51) Int. Cl.
*H04L 9/40*   (2022.01)
(52) U.S. Cl.
CPC ........ *H04L 63/123* (2013.01); *H04L 63/0442* (2013.01); *H04L 63/0471* (2013.01); *H04L 63/0478* (2013.01)

(58) Field of Classification Search
CPC ............... H04L 63/123; H04L 63/0442; H04L 63/0471; H04L 63/0478
See application file for complete search history.

(56) References Cited

U.S. PATENT DOCUMENTS

2006/0109982 A1\* 5/2006 Puiatti .................... H04N 7/163
348/E7.056
2007/0079117 A1\* 4/2007 Bhogal ..................... H04L 9/00
713/160

(Continued)

FOREIGN PATENT DOCUMENTS

JP    H08125651 A    5/1996
JP    H1188859 A    3/1999

(Continued)

OTHER PUBLICATIONS

Rao et al., "An FPGA Based Reconfigurable IPSec ESP Core suitable for IoT applications", Nov. 2016, 10th International Conference on Sensing Technology, pp. 1-5 (Year: 2016).\*

(Continued)

*Primary Examiner* — Kenneth W Chang
(74) *Attorney, Agent, or Firm* — Maier & Maier, PLLC

(57) ABSTRACT

In overview, a computer-implemented method of transmitting data in a data stream from a first device to a second device is disclosed. The data stream is encrypted before transmission from the first device to the second device, and a location of the data in the data stream is indicated to the second device. The location may be a pre-shared location between the first and second devices, or the first device may transmit the location of the data to the second device. The second device decrypts the encrypted data stream, identifies the data in the data stream based on the location, and encrypts the identified data in the data stream.

22 Claims, 3 Drawing Sheets

(56) References Cited

U.S. PATENT DOCUMENTS

| | | | |
|---|---|---|---|
| 2010/0299517 A1* | 11/2010 | Jukic | H04L 63/0823 |
| | | | 713/193 |
| 2011/0161325 A1* | 6/2011 | Jones | G06F 16/958 |
| | | | 715/733 |
| 2012/0278635 A1* | 11/2012 | Hars | H04L 9/0637 |
| | | | 713/193 |
| 2015/0180931 A1* | 6/2015 | Marr | H04L 65/61 |
| | | | 709/219 |
| 2016/0156594 A9* | 6/2016 | Inforzato | H04L 63/12 |
| | | | 713/168 |
| 2017/0155703 A1* | 6/2017 | Hao | H04W 4/70 |
| 2018/0011867 A1* | 1/2018 | Bowman | H05K 999/99 |
| 2018/0176187 A1* | 6/2018 | Davis | H04L 63/061 |

FOREIGN PATENT DOCUMENTS

| | | | |
|---|---|---|---|
| JP | 2000508854 A | 7/2000 | |
| JP | 2002158654 A | 5/2002 | |
| JP | 2018510592 A | 4/2018 | |
| WO | 20180112071 A1 | 6/2018 | |

OTHER PUBLICATIONS

Office Action issued on Nov. 13, 2023, in corresponding Japanese Application No. 2021-531597, 14 pages.
Office Action issued on May 13, 2024, in corresponding Japanese Application No. 2021-531597, 11 pages.
Examination Report issued on May 31, 2024, in corresponding Australian Application No. 2019392497, 3 pages.
Office Action issued on Mar. 20, 2024, in corresponding Korean Application No. 10-2021-7019575, 10 pages.

* cited by examiner

SECURELY TRANSMITTING DATA IN A DATA STREAM

FIELD

The present disclosure relates to transmitting data and in particular to securely transmitting data in a data stream.

BACKGROUND

In computer networking, data is typically transmitted using two layers of encryption to provide privacy and data integrity between two or more devices. A first layer of encryption is typically applied to data to protect it "at rest" and to ensure its authenticity. The encrypted data is included in a data stream for transmission to another device. A second layer of encryption is applied globally at transport level to the data stream before it is transmitted.

Some devices, such as Internet of Things devices, are expected to have very low power consumption (they have to function for years on a small battery), have low storage (to keep costs down) and use a limited communication bandwidth. This is different from computers, tablets and phones on the internet, where power consumption, storage and bandwidth can be several orders of magnitude higher.

Accordingly, it is desirable to provide methods and devices enabling secure and low power data transmission. Additionally, or alternatively, data transmission should be executable by a first device, such as an Internet of Things device, having limited bandwidth and data storage capabilities to a second device, such as a back-end device having higher power and data storage hardware, that allows low power operation whilst maintaining data security. Furthermore, other desirable features and characteristics of the present invention will become apparent from the subsequent detailed description of the invention and the appended claims, taken in conjunction with the accompanying drawings and the background of the invention.

DETAILED DESCRIPTION OF THE DRAWINGS

Figure 1:
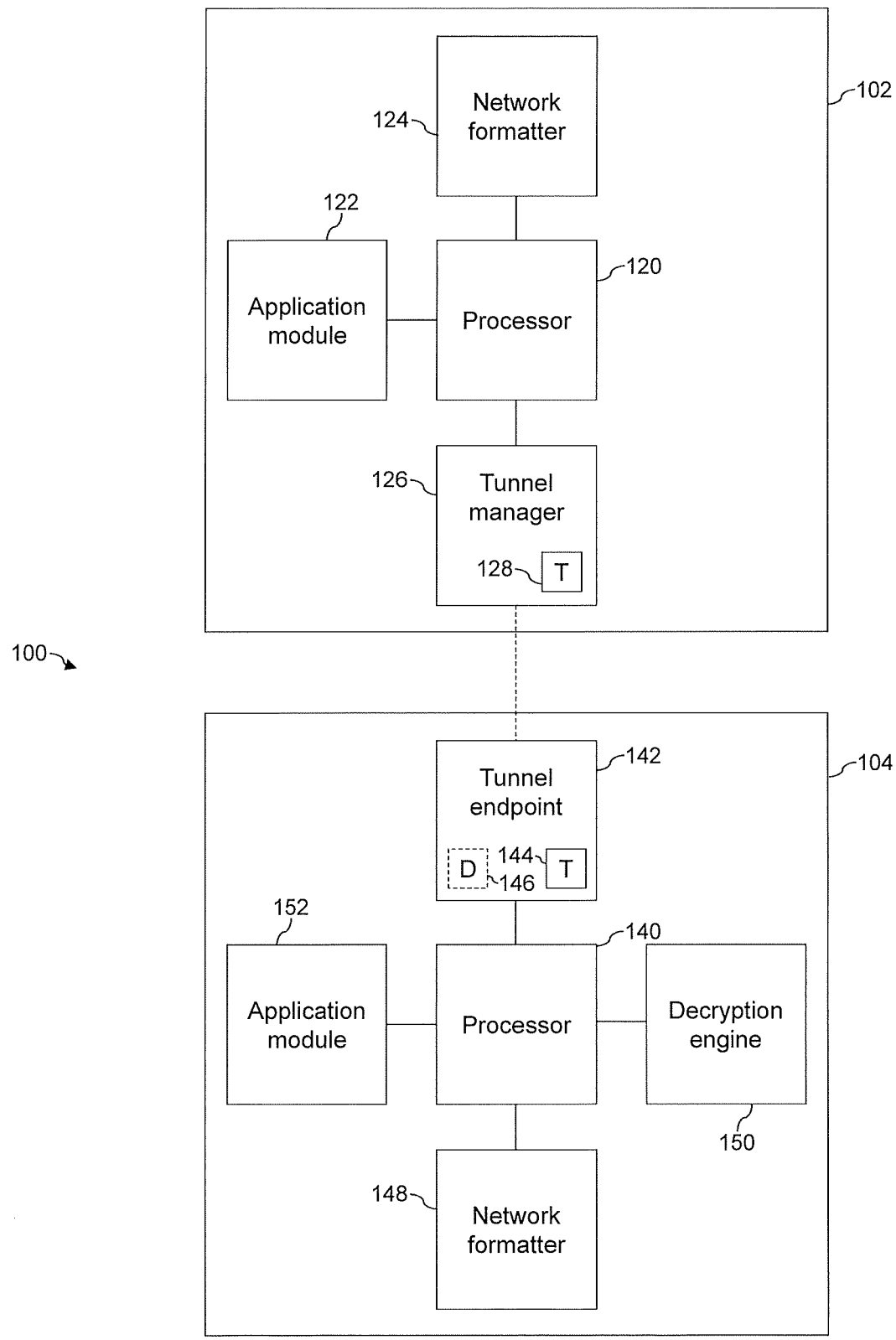
FIG. 1 illustrates a block diagram of a system for transmitting data.

In overview, a computer-implemented method of transmitting data in a data stream from a first device to a second device is disclosed. The data stream is encrypted before transmission from the first device to the second device, and a location of the data in the data stream is indicated to the second device. The location may be a pre-shared location between the first and second devices, or the first device may transmit the location of the data to the second device.

The data is then encrypted at the second device instead of the first device. In this way, the data can be securely transmitted from the first device to the second device, and the authenticity of the data can be maintained without requiring the first device to encrypt the data. Advantageously, by encrypting the data stream but not the data itself, power consumption of the first device may be reduced. Power-saving in data transmission is particularly beneficial in battery-powered devices such as an Internet of Things device. This effect can be achieved regardless of whether the location is transmitted from the first device to the second device or the location is a pre-shared location. In this way, these form alternative solutions that enable the same effect.

Another aspect of the present disclosure includes a computer-implemented method of receiving data by a second device from a first device. The method includes decrypting by the second device, an encrypted data stream received from the first device. The method includes identifying by the second device, data in the decrypted data stream based on, in a first option, a location provided by the first device, wherein the location is part of the data stream. In a second option, the method includes identifying the data by the second device based on a predetermined location in the data stream. Further, the method includes encrypting by the second device, the identified data in the data stream.

Further aspects of the disclosure relate to a computer-implemented method of receiving data in a data stream from a first device at a second device. The method comprises receiving, at the second device, an encrypted data stream from the first device. The encrypted data stream comprises the data. The second device receives metadata indicating a location of the data in the data stream. For example, if the location is a pre-shared location between the first and second devices, e.g. a shared secret, the metadata may be received prior to any encrypted data streams being received at the second device, i.e. hard coded during manufacture or set up of the second device. Alternatively, the second device may receive the metadata from the first device. The second device decrypts the encrypted data stream and identifies the data in the data stream based on the location indicated. The data is then encrypted at the second device, for example, in another data stream.

When the first device transmits the location of the data to the second device, the location is part of metadata that is transmitted from the first device to the second device. The metadata may be transmitted as part of the encrypted data stream, for example, in the header. Alternatively, the metadata may be sent separately from the encrypted data stream, in other words, the encrypted data stream may be transmitted using a first connection and the metadata may be transmitted using a second connection.

When the location of the data in the data stream is a pre-shared location between the first and second devices, the data is at a predetermined location in the data stream. For example, the predetermined location may be a fixed index or hardcoded parsing information such as a Tag in a TagLenValue, e.g. an asn1 sequence or a specific field of an xml or a json format. The predetermined location is based on the pre-shared location such that the second device can identify the data in the data stream. The predetermined location may be a fixed position in the data stream or a position in accordance with an algorithm of the pre-shared location. Predetermined in this context may be determined prior to transmitting the data stream.

Further aspects of the disclosure relate to a system comprising a processor configured to perform the steps of the method described above, a non-transitory computer readable medium having computer-executable instructions to cause a computer system to perform the steps of the method as described above, and a computer program product comprising instructions which, when the program is executed by a computer, cause the computer to carry out the steps of the method as described above.

Some specific embodiments are now described by way of illustration with reference to the accompanying drawings in which like reference numerals refer to like features.

With reference to FIG. 1, the system 100 comprises a first device 102 and a second device 104. The first device 102 is arranged to communicate with the second device 104, and the first and second devices may be connected over a network such as the internet, a local area network, a wireless local area network, a wide area network etc.

The first device 102 comprises a processor 120, an application module 122, a network formatter 124 and a tunnel manager 126. Each of the application module 122, the network formatter 124 and the tunnel manager 126 are operatively connected to the processor 120.

The application module 122 is arranged to run applications that output data, for example, based on input from a sensor. The network formatter 124 receives the data and any other data from the application module 122 and formats the data into a data stream. The network formatter 124 may format the data in a predetermined location in accordance with a pre-shared location, e.g. a shared secret with the second device. Alternatively, the network formatter 124 may send the location of the data in the data stream to the tunnel manager 126.

The tunnel manager 126 comprises a stream key database 128 storing a symmetric key T. The tunnel manager 126 is arranged to encrypt the data stream from the network formatter 124 using the symmetric key T. The tunnel manager 126 is configured to transmit the encrypted data stream to the second device 104. The tunnel manager 126 may be configured to generate metadata and send the metadata to the second device 104. The metadata may include the location of the data in the data stream, a cryptographic key, and/or a reference to a cryptographic key. The cryptographic key may be a private key of an asymmetric key pair, or a symmetric key.

The second device 104 comprises a processor 140, a tunnel endpoint 142, a network formatter 148, a decryption engine 150 and an application module 152. The tunnel endpoint 142, the network formatter 148, the decryption engine 150 and the application module 152 are each operatively connected to the processor 140.

The tunnel endpoint 142 comprises a stream key database 144 storing a copy of the symmetric key T. Optionally, the tunnel endpoint 142 comprises a cryptographic key database 146 storing one or more cryptographic keys including a cryptographic key D. The tunnel endpoint 142 is arranged to receive the encrypted data stream from the tunnel manager 126 of the first device 102.

The network formatter 124 and the tunnel endpoint 142 may be provisioned during set up with a pre-shared location regarding the location of the data in the data stream. This means the location of the data is predetermined, and the tunnel endpoint 142 is arranged to identify the data in the data stream based on the predetermined location of the data.

Alternatively, if the tunnel manager 126 is arranged to transmit metadata to the second device, the tunnel endpoint 142 is arranged to extract the location of the data from the metadata. The tunnel endpoint 142 is arranged to identify the data in the data stream based on the location from the metadata.

The tunnel endpoint 142 is arranged, once the data is identified in the data stream, to encrypt the data within the data stream.

The network formatter 148 is configured to receive the data stream from the tunnel endpoint 142, with the data encrypted, and extract the (encrypted) data and any other data. The decryption engine 150 is arranged to decrypt the data extracted from the data stream if applicable. The application module 152 is arranged to process the data.

Figure 2:
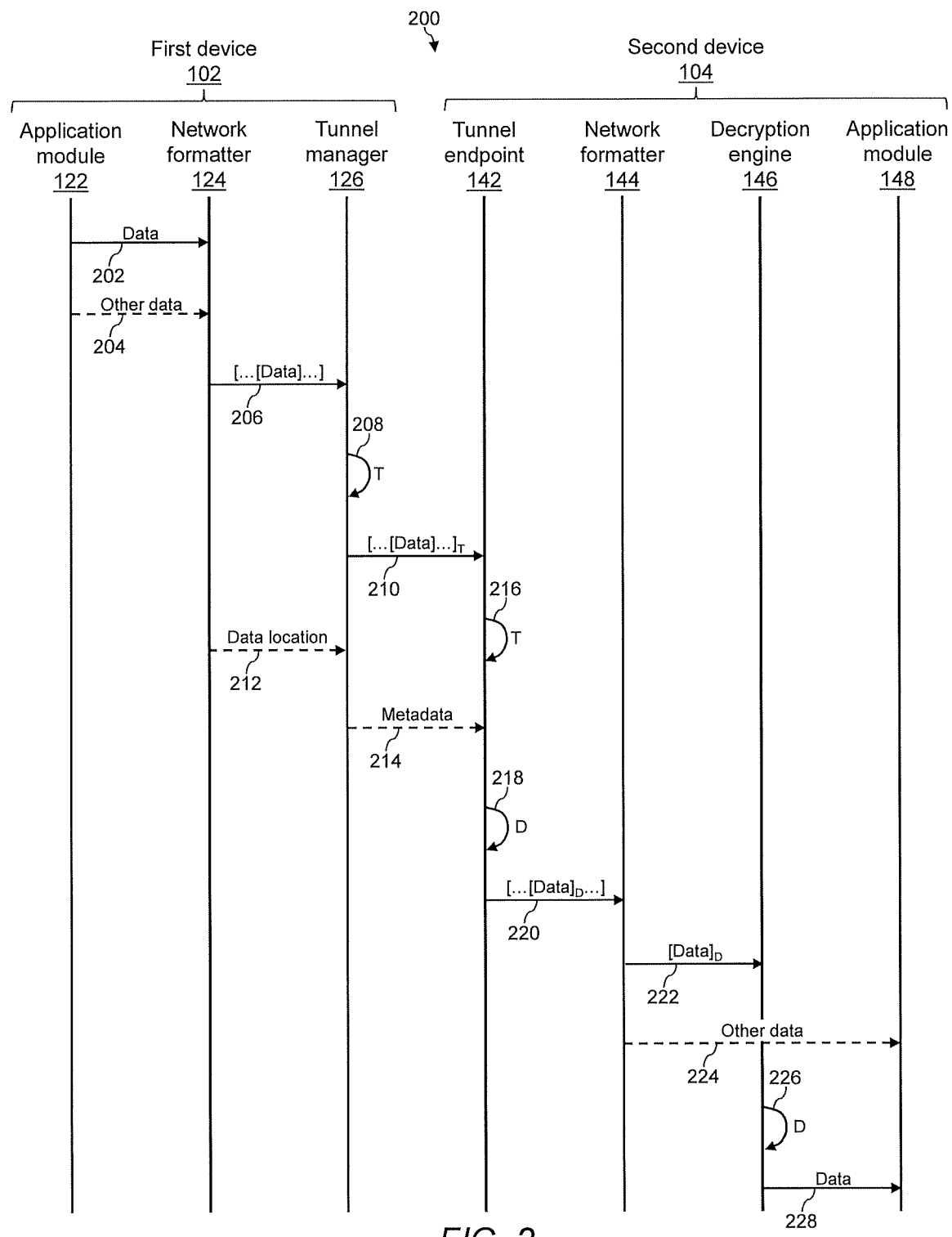
FIG. 2 illustrates a dataflow in the system of FIG. 1.

FIG. 2 illustrates a data flow 200 between the components of the first device 102 and the components of second device 104.

At step 202, the application module 122 generates data and sends this to the network formatter 124. The application module 122 may also generate other data at step 204 and send this to the network formatter 124.

At step 206, the network formatter 124 generates a data stream comprising the data along with any data received from step 204, and transmits the data stream to the tunnel manager 126. If the second device 104 is provisioned with a pre-shared location, then the network formatter 124 may incorporate the data into the data stream in a predetermined location.

The tunnel manager 126 encrypts, at step 208, the data stream with the symmetric key T from the stream key database 128. For example, the data stream may be encrypted with an 8-bit stream cipher to minimise the processing power required at the first device to encrypt the data stream. At step 210, the encrypted data stream is sent to the tunnel endpoint 142 of the second device 104.

If the second device 104 is not provisioned with a pre-shared location, i.e. the network formatter 124 did not incorporate the data into the data stream in a predetermined location, then at step 212, the network formatter 124 communicates the location of the data in the data stream to the tunnel manager 126. At step 214, the tunnel manager 126 then packages the location into metadata and transmits this to the tunnel endpoint 142. The metadata may be transmitted in step 214 as part of the encrypted data stream sent at step 210, for example, in the header of the data stream. Alternatively, the metadata may be sent at step 214 using a separate connection from the connection used to send the encrypted data stream sent at step 210, for example, the connections may use different ciphers to each other. Step 214 may occur before, in parallel or after step 210, i.e., the metadata may be sent at the same time, in advance of, or after the encrypted data stream.

At step 216, the tunnel endpoint 142 decrypts the encrypted data stream using the symmetric key T from the stream key database 144.

The tunnel endpoint 142 may retrieve the location of the data in the data stream from the metadata sent to it at step 214. Alternatively, if the location of the data is based on a pre-shared location, the tunnel endpoint 142 receives, e.g. during initial set up, metadata including the pre-shared location, and this is hard coded into the tunnel endpoint 142. Accordingly, the tunnel endpoint 142 may retrieve the location of the data in the data stream from the metadata sent to it during set up.

At step 218, the tunnel endpoint 142 identifies the data in the data stream using the location of the data. The tunnel endpoint 142 encrypts the data within the data stream at step 218, for example, using a cryptographic key D. The cryptographic key may be transmitted from the first device 102 to the second device 104 in the metadata at step 214. Alternatively, the metadata may indicate a cryptographic key to use from a plurality of cryptographic keys available in the cryptographic key database 146.

At step 220, the data stream with the encrypted data is transmitted from the tunnel endpoint 142 to the network formatter, and the network formatter 148 extracts the encrypted data and any other data from the data stream. At step 222, the network formatter 148 transmits the encrypted data to the decryption engine 150. If there is any other data in the data stream, at step 224, this is sent to the application module 152 of the second device 104.

At step 226, the decryption engine 150 decrypts the encrypted data. The data is then sent at step 228 to the application module 152 of the second device 104.

Figure 3:
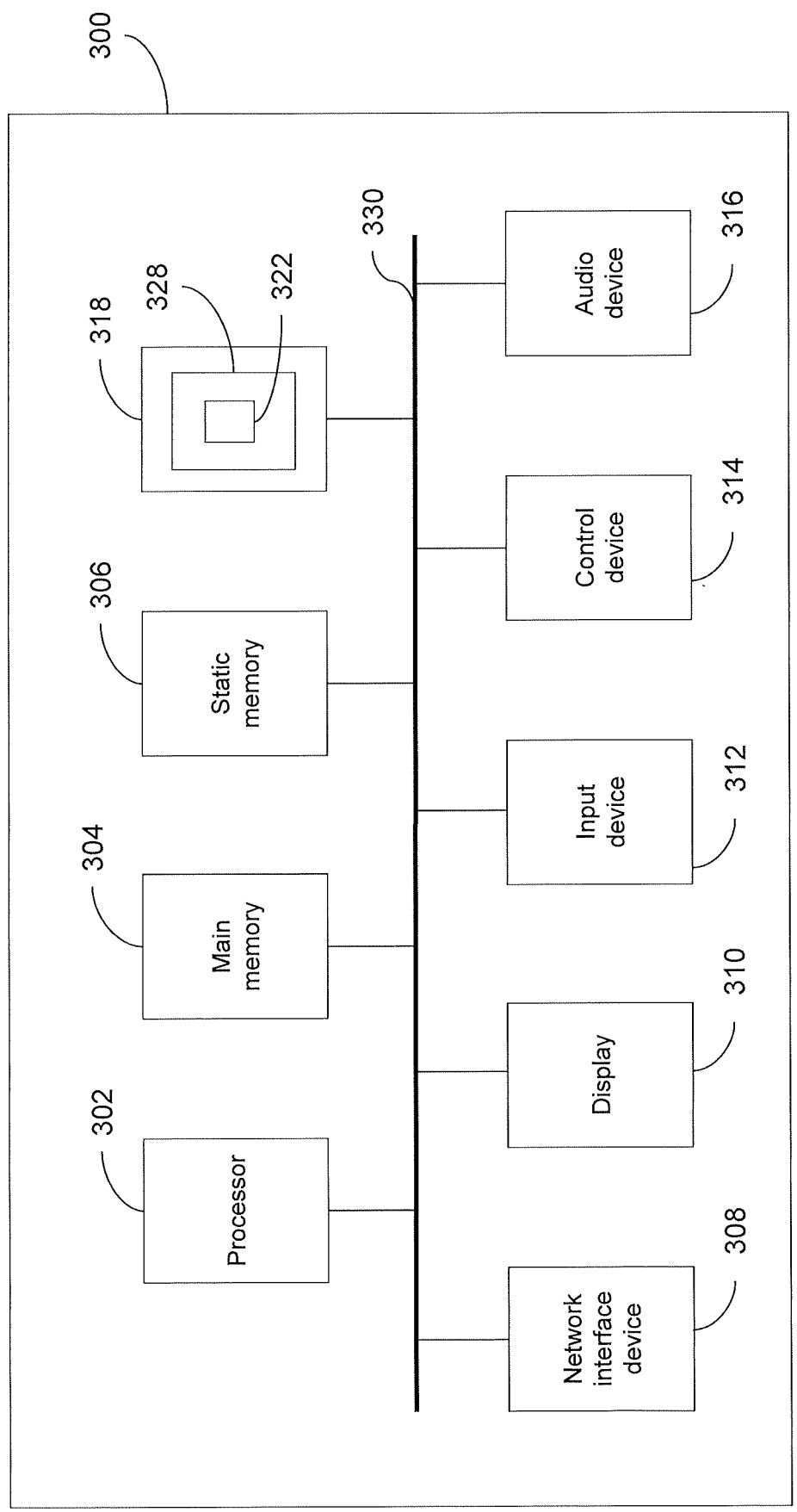
FIG. 3 illustrates a block diagram of one implementation of a computing device.

FIG. 3 illustrates a block diagram of one implementation of a computing device 300 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 300 includes a processing device 302, a main memory 304 (e.g., read-only memory (ROM), flash memory, dynamic random-access memory (DRAM) such as synchronous DRAM (SDRAM) or Rambus DRAM (RDRAM), etc.), a static memory 306 (e.g., flash memory, static random-access memory (SRAM), etc.), and a secondary memory (e.g., a data storage device 313), which communicate with each other via a bus 330.

Processing device 302 represents one or more general-purpose processors such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the processing logic (instructions 322) for performing the operations and steps discussed herein.

The computing device 300 may further include a network interface device 303. The computing device 300 also may include a video display unit 310 (e.g., a liquid crystal display (LCD)), an alphanumeric input device 312 (e.g., a keyboard or touchscreen), a cursor control device 314 (e.g., a mouse or touchscreen), and an audio device 316 (e.g., a speaker).

The data storage device 313 may include one or more machine-readable storage media (or more specifically one or more non-transitory computer-readable storage media) 323 on which is stored one or more sets of instructions 322 embodying any one or more of the methodologies or functions described herein. The instructions 322 may also reside, completely or at least partially, within the main memory 304 and/or within the processing device 302 during execution thereof by the computer system 300, the main memory 304 and the processing device 302 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W, DVD or Blu-ray disc.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "encrypting", "receiving", "determining", "comparing", "generating", "sending," "identifying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer-implemented method of transmitting data by an Internet of Things device to a second device, the method comprising:
   encrypting, by the Internet of Things device, a data stream including the data, thereby obtaining an encrypted data stream, wherein the Internet of Things device includes a processor, an application module, a network formatter, and a tunnel manager, wherein each of the application module, the network formatter and the tunnel manager are operatively connected to the processor;
   transmitting, by the Internet of Things device, the encrypted data stream to the second device to allow the second device to receive and decrypt the encrypted data stream to obtain a decrypted data stream;
   indicating, by the Internet of Things device to the second device, a location of the data in the data stream, the location allowing the second device to identify and encrypt the data in the decrypted data stream.

2. The computer-implemented method according to claim 1, further comprising:
   transmitting, by the Internet of Things device to the second device, metadata comprising the location of the data in the data stream.

3. The computer-implemented method according to claim 2, further comprising:
   transmitting, by the Internet of Things device, the encrypted data stream to the second device using a first connection, and
   transmitting, by the Internet of Things device, the metadata to the second device using a second connection.

4. The computer-implemented method according to claim 1, wherein the data in the data stream is unencrypted sensor data.

5. The computer-implemented method according to claim 1, wherein the Internet of Things device is a battery powered Internet of Things device, the data in the data stream is sensor data and the second device is a backend device.

6. The computer-implemented method according to claim 2, wherein the metadata comprises a cryptographic key, and the method further comprises causing the second device to encrypt the data into a second stream using the cryptographic key.

7. The computer-implemented method according to claim 2, further comprising:
   encrypting, by the Internet of Things device, the data stream using a first cipher, and
   encrypting, by the Internet of Things device, the metadata using a second cipher different from the first cipher.

8. The computer-implemented method according to claim 1, further comprising:
   running, on the application module, applications that output the data based on input from a sensor;
   receiving, by the network formatter, the data from the application module; and
   formatting, by the network formatter, the data into the data stream.

9. The computer-implemented method according to claim 1, further comprising:
   generating, by the tunnel manager, metadata; and
   transmitting, by the tunnel manager, the metadata to the second device, wherein the metadata includes the location of the data in the data stream and a cryptographic key or a reference to a cryptographic key.

10. An Internet of Things device, comprising:
    a processor implemented with one or more physical circuit components;
    an application module;
    a network formatter; and
    a tunnel manager, wherein each of the application module, the network formatter and the tunnel manager are operatively connected to the processor, the Internet of Things device being configured to:
    encrypt a data stream including data, thereby obtaining an encrypted data stream;
    transmit the encrypted data stream to a second device to allow the second device to receive and decrypt the encrypted data stream to obtain a decrypted data stream;
    indicate, to the second device, a location of the data in the data stream, the location allowing the second device to identify and encrypt the data in the decrypted data stream.

11. The Internet of Things device according to claim 10, further configured to transmit metadata to the second device, the metadata indicating the location of the data in the data stream.

12. The Internet of Things device according to claim 10, wherein the data in the data stream is unencrypted sensor data.

13. The Internet of Things device according to claim 10, wherein the Internet of Things device is a battery powered Internet of Things device, the data in the data stream is sensor data and the second device is a backend device.

14. The Internet of Things device according to claim 10, wherein the application module is arranged to run applications that output the data based on input from a sensor, and wherein the network formatter is configured to receive the data from the application module and to format the data into the data stream.

15. The Internet of Things device according to claim 10, wherein the tunnel manager is configured to generate metadata and transmit the metadata to the second device, wherein the metadata includes the location of the data in the data stream and a cryptographic key or a reference to a cryptographic key.

16. The Internet of Things device according to claim 10, further configured to encrypt the data stream using a first cipher, and configured to encrypt metadata using a second cipher different from the first cipher.

17. The Internet of Things device according to claim 10, further configured to transmit metadata using a first connection and to transmit the encrypted data stream using a second connection.

18. A non-transitory computer-readable storage medium comprising instructions which, when executed by a processor of an Internet of Things device, cause the processor to:
    encrypt a data stream including data, thereby obtaining an encrypted data stream for transmission by the Internet of Things device to a second device to allow the second device to receive and decrypt the encrypted data stream to obtain a decrypted data stream, wherein the Internet of Things device includes a processor, an application module, a network formatter, and a tunnel manager, wherein each of the application module, the network formatter and the tunnel manager are operatively connected to the processor, and generate an indication of a location of the data in the data stream, for transmission by the Internet of Things device to the second device to allow the second device to identify and encrypt the data in the decrypted data stream.

19. The non-transitory computer-readable storage medium according to claim 18, further comprising instructions which, when executed by the processor, cause the processor to:
generate metadata identifying the location of the data in the data stream, for transmission by the Internet of Things device to the second device using a second connection that is separate from a first connection used to transmit the encrypted data stream.

20. The non-transitory computer-readable storage medium according to claim 19, further comprising instructions which, when executed by the processor, cause the processor to:
encrypt the data stream using a first cipher, and
encrypt the metadata using a second cipher different from the first cipher.

21. The non-transitory computer-readable storage medium according to claim 18, further comprising instructions which, when executed by the processor, cause the processor to:
run, on the application module, applications that output the data based on input from a sensor;
receive, using the network formatter, the data from the application module; and
format, using the network formatter, the data into the data stream.

22. The non-transitory computer-readable storage medium according to claim 18, further comprising instructions which, when executed by the processor, cause the processor to:
generate, using the tunnel manager, metadata; and
transmit, using the tunnel manager, the metadata to the second device, wherein the metadata includes the location of the data in the data stream and a cryptographic key or a reference to a cryptographic key.

* * * * *